United States Patent [19]  [11] 4,025,479
Jung et al.  [45] May 24, 1977

[54] REMOVAL OF SULFURIC ACID COMPOUNDS

[75] Inventors: Albert Jung, Taunusstein; Johannes Reese; Kurt Hultzsch, both of Wiesbaden-Biebrich; Wolfgang Hesse, Breckenheim, all of Germany

[73] Assignee: Hoechst Aktiengesellschaft, Frankfurt, Germany

[22] Filed: Sept. 16, 1975

[21] Appl. No.: 613,882

Related U.S. Application Data

[63] Continuation-in-part of Ser. No. 164,129, July 19, 1971, Pat. No. 3,954,690, which is a continuation-in-part of Ser. No. 776,249, Nov. 15, 1968, abandoned.

[30] Foreign Application Priority Data

Nov. 17, 1967  Germany .......................... 1643829
Mar. 3, 1968  Germany .......................... 1768068
Aug. 3, 1968  Germany .......................... 1793116

[52] U.S. Cl. .................... 260/27 BB; 260/59 R; 260/64; 260/674 A; 260/675.5; 260/702; 528/498
[51] Int. Cl.$^2$ ......................................... C08L 93/00
[58] Field of Search ............. 260/27 BB, 59 R, 64, 260/702, 674 A; 528/498

[56] References Cited

UNITED STATES PATENTS 3,909,395  9/1975  Takacs ...................... 260/702 X
3,954,690  5/1976  Hesse et al. ...................... 260/25

*Primary Examiner*—Lewis T. Jacobs
*Attorney, Agent, or Firm*—Littlepage, Quaintance et al

[57]  ABSTRACT

Sulfuric acid compounds are removed from reaction mixtures by a reaction with polybutadiene alone or combined with unsaturated terpene compounds at elevated temperatures whereby products of reduction are formed which are volatilizable at the temperature of reaction and by expelling said products of reduction from the reaction mixture. Thus a product being substantially free from a sulfur content is obtained.

16 Claims, No Drawings

REMOVAL OF SULFURIC ACID COMPOUNDS

This is a continuation-in-part-application of Ser. No. 164,129, filed July 19, 1971, now U.S. Pat. No. 3,954,690, issued May 4, 1976 which is a continuation-in-part-application of Application Ser. No. 776,249, filed Nov. 15, 1968 now abandoned.

This invention relates to a process for the reductive removal of a sulfuric acid compound, i.e. of sulfuric acid and its acid-reacting derivatives from reaction mixtures.

Unsaturated terpene compounds such as terpentine oil, naturally occurring resinic acids or natural rubber are frequently reacted in the presence of sulfuric acid and acid-reacting derivatives thereof, for example in isomerisation, disproportionation and polymerisation processes, as well as in reactions involving the addition of phenolic compounds to terpenes. For example naturally occurring resinic acids or their esters may be dimerised or reacted with phenols in the presence of sulfuric acid and synthetic or naturally occurring rubber may be cyclised in the presence of sulfuric acid. In such processes sulfuric aicd or acid-reacting derivatives thereof are removed from the reaction media after the desired reaction has taken place by washing, usually after neutralisation e.g. with bicarbonate or carbonate. If solvents have been used or if volatile components have been formed these are usually removed by heat treatment and if the reaction product is high-melting and/or viscous the washing process itself may require the use of solvents which, in turn, must be distilled off. In any case the working up of a reaction product by means of a washing process is usually inconvenient.

We have now found a simple process, which does not involve a washing or neutralisation step, by which sulfuric acid and acid-reacting derivatives thereof can be removed from reaction mixtures containing them.

According to the present invention therefore there is provided a process of removing discoloring amounts of color forming sulfur compounds from the reaction products of a reaction mixture containing an acid-reacting sulfur-containing ingredient as a reagent, reaction product or catalyst, selected from the group consisting of sulfuric acid, sulfuric acid esters of olefins and sulfuric acid and sulfonic acids having at most two sulfonic acid groups, the improvement comprising reacting the reactants in the reaction mixture, then reacting said acid reacting sulfur containing ingredient in the reacted mixture with an amount of an olefinic unsaturated terpene or of polybutadiene or a combination thereof which amount is sufficient to react with and reduce all of said acid-reacting sulfur containing ingredients and form volatilizable reduction products of all of said sulfur containing ingredients and then heating and maintaining the reacted mixture until no more gaseous products are formed at a temperature between about ambient temperature and about 320° C that is sufficient to substantially reduce, volatilize and remove all of said sulfur containing reduction products to thereby provide an ultimate reaction product that is free of strong discoloring amounts of said color forming sulfur compounds.

Preferably the process of the invention is applied to reaction mixtures which contain (a) unsaturated terpenes (b) polybutadienes or (c) a mixture of (a) and (b). Such reaction mixtures which after the addition of sulfuric acid or of derivatives thereof generally become dark brown or even black are according to the invention heated to a temperature which is higher than that hitherto used in such reactions, and maintained at such temperatures until the reduction is substantially terminated. Thus the present reaction is also suitable for the removal of sulfuric acid or its derivatives such as sulfonic acids or sulfuric acid esters from reaction products, which per se do not contain polybutadiene and unsaturated terpenes, but from which such sulfur containing compounds cannot be removed without difficulty or from which such compounds can only be removed while impairing the properties of the final product. In this reaction there are formed large quantities of gaseous compounds, particularly sulfur dioxide, but also hydrogen sulphide. However there may also be formed minor amounts of sulfur. Water is a further reaction product. All these reaction products can by a proper conduction of the temperature be evaporated at ordinary pressure, if desired also at reduced or increased pressure, or in a current of an inert gas. Any elementary sulfur which is formed is also evaporated and may be condensed in a cooler. At the same time almost no discoloration of the final reaction mixture occurs, although initially a substantial discoloration is caused by the sulfuric acid and its acid derivatives. Accordingly the final products are very often even lighter in color than those obtained according to the hitherto used process including a washing and/or neutralisation procedure.

Acid-reacting derivatives of sulfuric acid include those containing an $SO_3$ group in a form such that they relatively fairly decompose at elevated temperatures, generally above 120° C. Such derivatives include particularly those of sulfuric acid and aromatic compounds such as hydrocarbons, unsubstituted or substituted phenols having up to 18 carbon atoms, and/or sulfonic acids formed from carboxylic acids as well as sulfonic acids and sulfuric acid esters formed from sulfuric acid and non-aromatic compounds, particularly unsaturated non-aromatic compounds e.g. olefins. Such suitable unsubstituted or substituted phenols having up to 18 carbon atoms are for example alkylphenols or arylphenols such as iso-propylphenol, tert-butylphenol, nonylphenol, dodecylphenol, styrenated phenol, the various phenylphenols, halogenophenols and nitrophenols. Sulfonic acids formed from carboxylic acids are for example the various mono- or dicarboxylic benzene sulfonic acids, sulfosalicylic acid, sulfoanthranilic acid.

The acid-reacting derivatives of sulfuric acid can either be added to the reaction mixture in pure form or be produced from sulfuric acid and another reagent in a connected process, possibly in the form of a stock mixture. In the latter case there are suitably used compounds which are per se contained in the reaction mixture, or other compounds, such as those recited in the preceding paragraph. It is also possible to firstly react colophony with sulfuric acid (of Example 17) and then add phenol or any other reaction component.

Other sulfuric acid-derivatives which may reductively be removed from reaction mixtures by the process according to the invention include o- and p- phenol-sulfonic acid, the various phenol disulfonic acids or alkyl phenol sulfonic acids such as o- and p- cresol-mono- or di-sulfonic acid, in which $SO_3H$ groups are adjacent to the OH- group, butyl, octyl and dodecyl phenol sulfonic acids, sulfonic acids of aryl-substituted phenols, such as phenyl phenols, sulfonic acids of polyhydric phenols such as resorcinol, sulfonic acids of phenol-aldehyde condensates such as of dihydroxydiphenyl methanes or of the higher condensates commonly called novolaks, o- or p-halogeno phenol sulfonic acids or disulfonic acids, 2,4-dichlorophenol sulfonic acid, p-toluenesulfonic acid, the various sulfonic acids of the xylenes, mesitylene, diphenyl and naphthalene, halogeno sulfonic acids such as chloro- and bromosulfonic acid, sulfuric acid esters obtained by the addition of sulfuric acid to olefines, e.g. cyclic and acyclic terpenes or sulfonic acids of these terpenes.

During the process according to the invention sulfuric acid is reduced to $SO_2$, S or even $H_2S$ and this reduction may concur with a dehydrogenation of the reactants. Thus the sulfur compounds formed from the sulfuric acid and acid derivatives thereof as well of the prereaction-products — such as those of sulfuric acid and colophony — by scission and reduction may be eliminated on heating due to the fact that they are volatilizable which term is intended to include gaseous products. Consequently, no neutralisation and/or washing process is necessary, nor is any steam treatment and even distillation under reduced pressure to remove final traces of acid may be dispensed with. The products obtained react almost neutral provided no acidity is actually introduced into the end product, e.g. by other functional groups contained in the starting material. The process according to the invention is successful with all reaction products built up from terpenes, from polybutadienes or mixtures thereof, inasfar as they both still contain olefinic double bonds. The term "terpene compounds" as used herein incudes polymeric forms of isoprene or derivatives thereof irrespective of whether or not they are naturally occurring such as resinic acids, natural rubber or turpentine oil, or synthetic such as polyisoprene and whether they are cyclic or acyclic and furthermore Diels-Alder reaction products of colophony with dienophilic carboxyic acids or derivatives such as maleic anhydride or esterification products thereof.

Also colophony may be dehydrogenated at high temperatures by means of concentrated sulfuric acid and again light resins are obtained. The polybutadienes comprise high — and preferably low — molecular polybutadienes, the latter having an average molecular weight of up to 50,000, preferably up to 15,000.

The mixtures can also, if desired, contain other components, such as solvents, mono- or polyhydric, if desired polynuclear phenols or derivatives thereof, and fatty oils. An important application of the present invention is in processes where phenol and/or substituted phenols are present as reaction components and/or solvents. Exemplary of such phenols are phenol, resorcinol, the various cresols, xylenols or other alkyl phenols such as butyl-, octyl-, nonyl-, dodecylphenol, naphthols, phenol ethers such as anisole, chlorophenols, phenyl phenols or other aryl phenols, phenol carboxylic acids and bisphenols, such as bis-(4-hydroxyphenyl)-alkanes, e.g. bis-(4-hydroxyphenyl)-propane and its higher or lower homologs such as bis-(4-hydroxyphenyl-)methane or novolak derivatives of phenols containing at least three nuclei.

There are numerous reactions during which sulphuric acid or acid-reacting derivatives thereof are added, e.g. as reagents or catalysts and in which the removal of the sulfuric acid or derivative thereof is at least desirable. This can be achieved according to the invention by, e.g. at the end of the main reaction, adding suitable unsaturated terpene compounds in such quantities as are necessary for the reduction of the sulfuric acid components by heating.

The process according to the invention can be used on reaction products obtained by very different routes e.g. condensation, polymerisation or alkylation, the latter particularly with the formation of C-C or C-N bonds, if desired also with ester formation. It is particularly recommended when the separation of the acid from the reaction product is necessary but can be achieved only with difficulty by the usual methods. In particular sulfonic acid groups or sulfuric acid esters which are formed during the main reaction as undesired by-products may be easily removed by this process. For example, the sulfuric acid used for the catalytic alkylation of phenol or phenol derivatives with olefines, e.g. cycloolefines, such as with diisobutylene, cyclohexene, styrene (on the olefinic group) and the like, can be eliminated without a washing or neutralisation process by reduction at an elevated temperature in an after-treatment with colophony, pinene, dipentene or other suitable terpenes with polybutadienes or mixtures thereof. The process is also applicable to the reduction products of phenols with unsaturated compounds having little or no reductive action on the sulfuric acid or sulfonic acid components, e.g. addition products of phenols with unsaturated esters, fatty acids, etc.

The present process may also be used in the purification of the products obtained during the reaction of phenols or phenol derivatives with aldehydes, in particular formaldehyde, or with ketones or compounds which split off such carbonyl compounds under the conditions of the reaction. These reactions may be relatively slow due to a small reactivity of the phenols or the phenol derivatives and/or the carbonyl compound and it is therefore desirable to employ sulfuric acid or sulfonic acids as condensing agents. When using sulfuric acid there is a danger that it may become partly incorporated in the condensation product in the form of sulfonic acids or sulfuric acid esters and these products may prove to be difficult to remove by the usual methods so that during the further working up or processing of the products they may have an undesirable effect e.g. on heating they may initiate decomposition and cause a dark discoloration. To alleviate these difficulties many of these processes have hitherto often been performed with concentrated hydrochloric acid which, however, required corrosion-resistant, and therefore costly, reaction vessels. The present process simplifies working and it is still possible to obtain light and stable end products.

Illustrative of slowly reacting phenols are e.g. long-chained alkyl phenols with a carbon chain of 3 to 15 C-atoms such as p-tert-butyl-, p-diisobutyl or p-triisobutyl phenol, halogeno-phenols such as mono- or dichloro- or mono- or dibromo-phenols, aryl phenols in particular p-aryl phenols such as p-phenyl phenol, phenols containing several rings such as naphthols or bisphenols such as p,p'-dihydroxydiphenyl alkanes, phenol ethers with saturated or unsaturated aliphatic groups having 1–12 C-atoms and also having COOH- or OH- groups such as phenetol, phenoxy acetic acid, diphenyl glycerol ether, phenyl allyl ether, etc. or phenol ethers with aromatic radicals.

Illustrative of slowly reacting carbonyl compounds are, in particular, those having 2 to 9 C-atoms such as acetaldehyde, propionaldehyde, butyr- or isobutyraldehyde, acetone, cyclohexanone or acetophenone. Thus, the reaction product prepared from 2 mols of phenol and 1 mol of acetone using sulfuric acid, consisting essentially of bis-(4-hydroxyphenyl)-propane (diane) cannot be heated above the melting point or distilled without decomposition even after careful washing with water because traces of unremoved sulfonic acids cause a decomposition of the diane accompanied by darkening. On distillation in the presence of colophony or other terpenes such as pinene such decomposition does nor occur and a light product is obtained which can be distilled without decomposition under reduced pressure.

Other reactions in which sulfuric or sulfonic acid type reagents or by-products may be removed by thermal after-treatment with terpene compounds or with polybutadiene include the polymerisation of olefines performed with sulfuric acid, such as the preparation of coumarone-indene resins. In this reaction there may be discoloration of the product due to the incorporation of sulfonic acids which have also emulsifying properties (cf. J. Scheiber, Chemie und Technologie der kuenstlichen Harze, 1943, p. 267 ff). However, neutralisation and washing of the sulfuric acid components can be completely avoided and relatively light end products result if a terpene or polybutadiene are added after polymerisation has been completed and the volatile, nonpolymerised components are distilled off at normal pressure.

For the reductive removal of sulfuric acid or its acid-reacting derivatives the above-mentioned polybutadiene or terpene compounds are particularly suited and of these naturally occurring resinic acids are preferred. The quantity of terpene compounds or of the polybutadiene employed is preferably just sufficient to reduce the catalyst but not so much as to have a negative influence on the properties of the condensation products. It is generally between two and ten times the weight of sulfuric acid or sulfuric acid derivative present and this generally presents 3 – 30% by weight of the condensate. However larger quantities of terpene compounds or of polybutadiene can also be added without any harmful effect.

If by the addition of a polybutadiene alone or in combination with a terpene sulfuric acid or the derivatives thereof have been removed from synthetic resins which per se did not contain terpenes or polybutadienes, but only the sulfuric acid or its derivative, the final products very often have improved properties due to the after-treatment with the terpenes or the polybutadienes. Thus products may be obtained which are not only light in color, but have also a higher melting point and an improved solubility than those products which have been produced from equal amounts of the same starting materials, but have been worked up with the aid of a washing procedure.

The present process is generally performed in the temperature range frm 50° to 320° C, preferably from 170° to 280° C. However, it will be appreciated that in some reactions dependent on the reaction components decomposition begins already at fairly low temperatures e.g. room temperature, and that no temperature is applied at which the product would even be decomposed in the absence of sulfuric acid or its derivatives, since clearly in such cases the temperatures cited above are unsuitable. In general however, for complete removal of the $SO_3$ grouping and/or in order to obtain products which are not discolored, temperatures of at least 170° C are necessary. It is also possible to work under reduced or, less advantageously, under increased pressure. Thus the temperature varies dependent on the nature of the reaction mixture at which the reductive decomposition of the sulfuric acid or sulfuric acid derivative begins. In reactions with resinic acids reductive decomposition begins below about 80° – 100° C, e.g. at 50° C, is greatly intensified between 120° and 170° C and is completed at even higher temperatures.

In other cases e.g. in reactions of polyisoprene in the presence of phenols or in reactions of terpene hydrocarbons, the reductive decomposition only begins at above 150° C. Of course the reductive elimination of sulfuric acid or sulfuric acid derivatives according to the invention also depends on their quantity.

It was surprising and in advantageous that the thermal, reductive removal of sulfuric acid or sulfuric acid derivatives occurs without disturbing secondary reactions such as e.g. often occur with resinic acids in the form of decarboxylation of the carboxyl group.

The initially cited technical processes as well as other similar processes using diluted or concentrated sulfuric acid as the reagent, can be performed much more easily using the process according to the present invention, and the products prepared may be valuable intermediates or final products e.g. varnish raw materials. In addition, they are suitable for known applications e.g. for the preparation of coatings, adhesives and printing inks.

The following Examples, substantially free of aldehydes, wherein parts referred to are parts by weight, illustrate the invention. In the Examples melting points are determined by using a capillary tube.

EXAMPLE 1

300 parts of phenol are mixed with 3 parts of concentrated sulphuric acid and then at 50° C over a period of three hours 300 parts of terpentine oil are added dropwise in such a way that, as a result of the exothermal reaction, the temperature rises continuously to 80° C. Over a period of 5 hours the temperature is slowly raised to 170° C then held at this temperature until the reaction mixture becomes clear and virtually free from sulphur dioxide. The temperature is raised to 220° C and excess phenol is distilled off then, over a further 2 hours, the temperature is raised to 260° C at which temperature only very slight transformation of the resin occurs. 350 parts of a light yellow terpene-phenol resin melting at 70° C is obtained. A solution in a mixture of equal parts by volume of toluene and ethanol shows an almost neutral reaction with methyl orange indicating that the product is free from sulphuric acid.

EXAMPLE 2

300 parts of comminuted polyisoprene and 10 parts of concentrated sulphuric acid are added to 300 parts of phenol at 170° C and the mixture is kept at this temperature for 7 hours. The polyisoprene gradually goes into solution and sulphur dioxide is evolved. An initially brown-black coloured reaction mixture becomes considerably lighter during this time. Subsequently excess phenol is distilled off at temperatures of up to 260° C and 330 parts of product are obtained which product may be used as a raw material in the manufacture of varnish. A solution in a mixture of equal parts by volume of toluene and ethanol shows a neutral reaction with methyl orange.

If in place of synthetic polyisoprene natural rubber is used and/or the cyclisation is performed in the presence of another solvent such as an aliphatic, aromatic or halogenated hydrocarbon instead of phenol, products free from sulphuric acid are also obtained.

EXAMPLE 3

600 parts of ester gum and 300 parts of phenol are mixed at 80° C with 12.5 parts of concentrated sulphuric acid. The temperature is raised to about 90° C, the mixture darkens and some sulphur dioxide is evolved. On further heating to 180° C the bulk of the sulphur dioxide is evolved. After distilling off excess phenol in vacuo 680 parts of an amber-coloured resin, free from sulphuric acid having a melting point of 115° C are obtained.

EXAMPLE 4

650 parts of a reaction product of 1400 parts of colophony with 300 parts of maleic anhydride and 250 parts of phenol are mixed at 80° C with 15 parts of concentrated sulphuric acid. The temperature rises slightly, the mixture darkens and some sulphur dioxide is evolved. The gas evolution ceases when the temperature is raised to 180° C. After distilling off excess phenol 670 parts of a yellow resin free from sulphuric acid are left with a melting point of 117° C.

EXAMPLE 5

300 parts of colophony are dissolved in 100 parts of toluene at 70° C, then cooled to −10° C. 25 parts of concentrated sulphuric acid are added dropwise over a period of 1 hour in a manner such that the temperature does not rise above 40°0 C then the mixture is held below 40° C. for 8 hours. During this time polymerisation occurs accompanied by the evolution of sulphur dioxide. The temperature is raised to 220° C and the reaction product is restored almost to its original lightness. The melting point of the resin formed is about 25° C higher than that of the original colophony and the acid number is 146 as compared with an initial value of 165. The product shows an almost neutral reaction with methyl orange.

EXAMPLE 6

600 parts of colophony and 220 parts of a technical mixture of cresols containing mainly m-cresol are mixed at 80° C with 12.5 parts of concentrated sulphuric acid. The temperature is allowed to rise to 95° C due to the exothermal reaction and darkening occurs. On heating to 150° C there is considerable evolution of sulphur dioxide and the reaction mixture lightens almost to its original colour. Excess m-cresol is distilled off in vacuo and 660 parts of a very light resin, free from sulphuric acid melting at 113° C is obtained. If a technical cresol mixture having a major proportion of p-cresol is used a light yellow resin is also obtained.

EXAMPLE 7

300 parts of colophony and 130 parts of o-chlorophenol are mixed with 6 parts of concentrated sulphuric acid at 80° C. The temperature is allowed to rise to 90° C, the mixture darkens and some evolution of sulphur dioxide occurs. The bulk of the sulphur dioxide is evolved at 150° C, at which temperature the reaction mixture lightens to almost its original colour. Unreacted o-chlorophenol is distilled off in vacuo and 310 parts of a yellow resin, free from sulphuric acid, and having a melting point of 89° C are obtained.

EXAMPLE 8

600 parts of colophony and 300 parts of o-sec. butyl phenol are mixed with 12.5 parts of concentrated sulphuric acid, the mixture darkens and the temperature rises to 90° C. The temperature is raised to 150° C and sulphur dioxide is evolved then excess o-sec.-butyl phenol is removed from the clear mixture by distillation in vacuo. 660 parts of resin free from sulphuric acid are obtained having a melting point of 105° C. If instead of the o-sec-butyl phenol the same quantity of p-tert-butyl phenol is reacted, an amber-coloured resin is obtained. If the colophony is reacted in analogous manner with 200 parts of octyl or nonyl phenol light resins are again obtained.

EXAMPLE 9

600 parts of colophony and 250 parts of 1,2,4-xylenol are mixed with 13 parts of concentrated sulphuric acid at 80° C. The temperature is allowed to rise to 90° C, the mixture darkens and some evolution of sulphur dioxide occurs. The bulk of the sulphur dioxide is evolved at 150° C and excess xylenol is distilled off in vacuo to yield 620 parts of a golden-yellow resin free from sulphuric acid melting at 102° C.

EXAMPLE 10

600 parts of colophony and 110 parts of resorcinol are slowly mixed at 100° C with 2.5 parts of concentrated sulphuric acid. The mixture darkens and the temperature rises to 122° C due to the exothermal reaction at which temperature the reaction mixture becomes clear and very viscous. The bulk of the sulphur dioxide is evolved at 140° C and 620 parts of a light resin free from sulphuric acid and melting at 122° C is obtained.

EXAMPLE 11

300 parts of colophony and 145 parts of α-naphthol are mixed with 6 parts of concentrated sulphuric acid at 80° C. The mixture darkens and the temperature is allowed to rise to 100° C at which temperature the reaction mixture becomes very viscous. Evolution of sulphur dioxide commences at 90° C. The resulting resin lightens during distillation in vacuo to yield 325 parts of a product melting at 113° C.

EXAMPLE 12

600 parts of colophony and 230 parts of bisphenol A [bis(4-hydroxyphenyl)-propane] are mixed at 135° C with 2.5 parts of concentrated sulphuric acid. The mixture darkens and, accompanied by pronounced evolution of sulphur dioxide, the temperature is allowed to rise to 140° C. The bulk of the sulphur dioxide is evolved at 150° C. After distillation in vacuo 620 parts of a very light reaction product free from sulphuric acid are obtained melting at 112° C.

EXAMPLE 13

600 parts of colophony and 320 parts of a novolak (prepared in the usual manner from 1 mol of phenol and 0.8 mol of formaldehyde) are mixed at 120° C with 10 parts of concentrated sulphuric acid. The temperature rises to 135° C due to the exothermal reaction at which temperature the reaction mixture becomes dark and viscous. At 180° and 200° C pronounced sulphur dioxide evolution occurs and the resin becomes light. After distillation in vacuo 800 parts of a product free from sulphur dioxide melting at 130° C are obtained.

EXAMPLE 14

600 parts of colophony and 220 parts of anisole are mixed with 5 parts of concentrated sulphuric acid at 80° C. The mixture darkens and the temperature is allowed to rise to 90° C. The temperature is raised to 150° C and maintained at this level until the evolution of sulphur dioxide which starts at about 100° C ceases. Excess anisole is distilled off in vacuo to yield 640 parts of a light resin free from sulphuric acid and having a melting point of 118° C.

EXAMPLE 15

300 parts of phenol are mixed with 3 parts of o-chlorophenol sulphonic acid. Then over a period of 3 hours at 50° C, 600 parts of terpentine oil are added dropwise so that, due to the exothermal reaction, the temperature rises continuously to 100° C. Over a further three hours the temperature is raised slowly to 190° C, and this temperature is maintained until the reaction mixture becomes clear and evolution of sulphur dioxide ceases. Excess phenol is then distilled off at 220° C and over a further 2 hours the temperature is raised to 270° C at which temperature the resin is formed. 700 parts of a yellow terpene-phenol resin melting at 70° C are obtained. A solution in a mixture of the same parts by volume of toluene and methanol shows an almost neutral reaction with methyl orange indicating that the product is free from o-chlorophenol-sulphonic acid.

EXAMPLE 16

300 parts of comminuted polyiosprene and 5 parts of a mixture of o- and p-phenol sulphonic acid are added to 300 parts of phenol at 175° C and this temperature is maintained for 8 hours. The polyisoprene gradually passes into solution and sulphur dioxide is evolved. The initially brown-black coloured mixture becomes lighter and subsequently excess phenol is distilled off at up to 260° C. 330 parts of a product suitable for use as a raw material in the manufacture of varnish are obtained. A solution in a mixture of the same parts by volume of toluene and ethanol shows a neutral reaction with methyl orange.

If natural rubber is used instead of polyisoprene and/or the cyclisation is performed in the presence of another solvent such as an aliphatic, aromatic or halogenated hydrocarbon instead of phenol, products free from phenolsulphonic acid are again obtained.

EXAMPLE 17

12 parts of concentrated sulphuric acid are slowly added to 600 parts of colophony at 100° C. The mixture darkens and the temperature rises, due to the exothermal reaction, to 135° C at which temperature the reaction mixture becomes more viscous. Subsequently 280 parts of phenol heated to 60° C are added and the mixture is maintained for 2 hours at 120° C. On further heating at 170° to 190° C extensive evolution of sulphur dioxide occurs and at 220° to 240°C. the reaction mixture clears. After distillation in vacuo 700 parts of a yellow resin having a melting point of 125° C are obtained.

EXAMPLE 18

600 parts of colophony and 320 parts of a novolak (prepared in the usual manner from 1 mol of phenol and 0.8 mol of formaldehyde) are mixed at 120° C with 10 parts of chlorosulphonic acid. The mixture darkens and the temperature rises, due to the exothermal reaction, to 130° C at which temperature the reaction mixture becomes more viscous. Pronounced evolution of sulphur dioxide occurs when the temperature is raised to 180° to 200° C and the reaction mixture becomes lighter. After distillation in vacuo 800 parts of an amber-coloured resin are obtained. The product is free from chlorosulphonic acid and melts at 130° C.

EXAMPLE 19

752 parts of phenol, 548 parts of isobutyraldehyde and 4 parts of sulphuric acid are boiled for eight hours. The temperature rises over 2 hours from 68° C to 110° C. After 8 hours the isobutyraldehyde content is to 1.7 %. 20 parts of balsam colophony are added and the volatile components are distilled off. The temperature rises to 260° C and above 180° C the black-brown coloured mixture becomes much lighter. On reaching 260° C the reaction mixture is cooled and 1108 parts of an amber-coloured resin having a colour value of 30–35 (according to Hellige) and a melting point of 85° C are obtained. A solution in a mixture of equal parts toluene and ethanol shows a neutral reaction with methyl orange.

EXAMPLE 20

300 parts of p-tert-butyl phenol are melted and 2 parts of phenol-sulphonic acid are added. 100 parts of acrolein are added dropwise at 105° C and 25 parts of tallcolophony are added to the black coloured mixture. The mixture is stirred for a further hour at 110° C and the volatile components are distilled off at atmospheric pressure. The mixture becomes lighter at 120° C at which temperature evolution of sulphur dioxide begins and, on reaching 260° C the evolution of sulphur dioxide has ceased. The mixture is heated to 290° C and then cooled to 180° C in the presence of an inert gas. 320 parts of a light resin having a colour value between 20 and 30 (according to Hellige) are obtained. The solution of the resin in a mixture of equal parts of toluene and ethanol shows a neutral reaction with methyl orange.

EXAMPLE 21

188 parts of phenol and 63 parts of acetone are condensed in 800 parts of 72 % sulphuric acid at 40° C for 30 hours, then crystalline separation of the bis-(4-hydroxyphenyl)-propane formed commences. The crystal formation is favored by cooling and the addition of 10 parts of toluene. The crystals are filtered off, thoroughly washed with water and dried in an air-drying cubicle at 85° C. The product obtained has a melting point of 153° C. After repeated washing, even accompanied by the addition of ammonia, they are found to be not completely free from the sulphonic acids formed, which e.g. on distillation at 15 to 20 Torr cause considerable decomposition and the formation of large amounts of residue. The distillate obtained is an intense orange-yellow colour and contains besides other products much mononuclear phenol. In addition, large amount of an almost black residue are left behind.

If 5% colophony is added to the raw material to be distilled it can be distilled practically undecomposed. The distillate is almost colourless and consists of pure bis-(4-hydroxyphenyl)-propane. The approximately 8% residue left behind is also much lighter than the residue produced without the addition of colophony. In the same way bis-(4-hydroxyphenyl)-propane containing sulphonic acid can be mixed with 5% α-pinene instead of 5% colophony, and this is then distilled at 15 to 20 Torr. Once again a very pure distillate of the bis-(4-hydroxyphenyl)-propane is obtained and less than 5% residue is left behind.

EXAMPLE 22

6 g of concentrated sulphuric acid are added to 94 g of phenol. The 104 of styrene are gradually added dropwise firstly at 50° C, later-on at a higher temperature. The reaction is exothermic and towards the end of the addition a temperature of 115° C is reached. During the further heating the reaction mixture becomes dark. Now 20 to 60 g of colophony are added in order to remove the catalyst. Within the temperature range of 140° to 200° C an intensive formation of sulphur dioxide takes place and at the same time the product becomes lighter. After distilling off only partially reacted components at a temperature of about 260° C, 160 g of a soft yellow-brown product which is used for further reactions are obtained.

EXAMPLE 23

A product is prepared from 100 g of phenol and 111 g of styrene with 2 g of 20% oleum according to example 22 and the product is further reacted with 91 g of 30% formaldehyde solution to form a styrene containing novolak which has a dark color. Now 20 g of colophony are added in order to remove the sulphuric acid catalyst. The reductive decomposition of the oleum essentially takes place in the temperature range between 140° and 220° C in which the volatile parts are distilled off at 260° C. 240 g of a yellow solid resin with a melting point of 73° C are obtained.

EXAMPLE 24

6 g of concentrated sulphuric acid are added to 94 g of phenol at 50° C. Then 68 g of isoprene are added dropwise and in the course of the exothermic reaction the temperature is increased to 140° C. Between 130° and 140° C there is a weak formation of sulphur dioxide which becomes intensive by addition of 50 g of colophony and which is finally completed at higher temperatures between 220° and 240° C by distillation off the volatile parts. 170 g of a solid resin with a melting point of 65° C are obtained.

EXAMPLE 25

12 g of concentrated p-phenol sulphonic acid are added to 94 g of phenol. Then 112 g of diisobutylene are dropwise added which react in an exothermic reaction under dark coloration. After adding 20 to 60 g of colophony an intensive formation of sulfur dioxide takes place already at 120° C which is finished at 180° C. After the processing in vacuum at 260° C 180 g of an amber colored product with a melting point of 64° C are obtained.

EXAMPLE 26

4 g of concentrated sulphuric acid are added to 94 g of phenol. Then beginning with a temperature of 50° C 264 g of dicyclopentadiene are added dropwise. The reaction is exothermic under dark coloration. Now 50 g of colophony are added in order to remove the catalyst. At the same time with the formation of volatile products the product becomes lighter. After processing in vacuum at 240° to 260° C in distilling off the low molecular parts 250 g of a resin with a melting point of 130° C are obtained.

EXAMPLE 27

6 g of concentrated sulphuric acid are added to 94 g of phenol. Then 120 g of a mixture of various petroleum fractions with a boiling point of 140° to 195° C, essentially consisting of a mixture of hydrocarbon substituted cyclic hydrocarbons, especially aromatic ones, are added dropwise. By addition of 20 g of synthetic polyisoprene which is decomposed by the sulphuric acid and which has a strong reduction effect the catalyst is removed from the obtained viscous product by a distillation in vacuum for three hours at 260° C. 185 g of a soft plastic product are obtained.

EXAMPLE 28

6 g of p-phenol sulphonic acid are added to 94 g of phenol. Then 280 g of dehydrogenated castor oil fatty acid are added dropwise within 1 hour at 50° C. The separation of the catalyst by reduction is effected by adding 50 g of colophony. After processing in vacuum for five hours at 260° C 380 g of a dark yellow high viscous product are obtained.

EXAMPLE 29

2 parts of concentrated sulphuric acid are slowly added to 200 parts of phenol at a temperature of 50° C. Then 100 parts of a low molecular polybutadiene (iodine number 450, average molecular weight 3200) are added dropwise within 90 minutes. Already at the beginning reaction the mixture becomes black-brown. The reaction mixture gradually becomes more and more viscous under a weak exothermic reaction. Under heating at a temperature of 90° C the reaction becomes more exothermic under formation of sulphur dioxide and under a temperature increase which may reach 160° C. Then the reaction mixture begins to become lighter at 180° C. The heat treatment is continued in vacuum until 230° C and an amber colored resin is obtained with a yield of 137%, referred to the starting low molecular polybutadiene. Melting point of the resin 128° C, OH-number 160. A resin with the same properties is obtained if instead of the above-mentioned polybutadiene a polybutadiene with an average molecular weight of 1400 and an iodine number of 450 is used as a starting material.

EXAMPLE 30

2 parts of phenol sulphonic acid (65%) are added to a mixture consisting of 300 parts of phenol, 100 parts of low molecular polybutadiene and 10 parts of colophony at a temperature of 70° C. The mixture is processed according to example 29, however the reaction mixture is heated to 260° C instead of 230° C. A light colored resin with a color number of 20 is obtained with a yield of about 140%, referred to the total weight of the starting colophony and low molecular polybutadiene. It has a melting point of 128° C and a viscosity (50% solution in toluene/20° C) of 2760 cP, a OH-number of 112 and an acid number of 5.

The polybutadiene which is used in this example is the same as in example 29 and it may also be substituted by the polybutadiene as mentioned in the last paragraph of example 29.

EXAMPLE 31

0.6 parts of a 65% phenol sulphonic acid are added to a mixture of 340 parts of phenol formaldehyde resin and 46 parts of p-formaldehyde at 40° C. Then the temperature is increased to 58° C within 30 minutes. The exothermic reaction begins at this temperature after some time and causes an increase of the temperature up to 105° C. After refluxing for 3 hours the temperature is increased to 150° C under reduced pressure. After this treatment a novolak is obtained which has a strongly acid reaction with methylorange. In order to remove the phenol sulphonic acid 15 parts of a low molecular polybutadiene oil (iodine number 450, average molecular weight of about 1400) are added and the mixture is heated to 170° C. At this temperature an intensive formation of sulphur dioxide begins and the reaction mixture changes its color from slightly red to pale yellow. The reaction mixture is then further heated to 240° C. Having reached this temperature the reaction product has a neutral reaction which shows that it is practically free of the phenol sulphonic acid. 263 parts of a resin with a melting point of 72° C are obtained. The yield is 73%.

EXAMPLE 32

752 parts of phenol, 548 parts of isobutyraldehyde and 4 parts of sulphuric acid are boiled for eight hours. The temperature rises over 2 hours from 68° C to 110° C. After eight hours the isobutyraldehyde content is to 1.7%. 100 parts of polybutadiene oil are added and the volatile components are distilled off. The temperature rises to 260° C and above 180° C the black-brown coloured mixture becomes much lighter. On reaching 260° C the reaction mixture is cooled and 1160 parts of an amber-coloured resin having a colour value of 45–50 (according to Hellige) and a melting point of 65° C are obtained. A solution in a mixture of equal parts toluene and ethanol shows a neutral reaction with methyl orange.

EXAMPLE 33

6 g of concentrated sulphuric acid are added to 94 g of phenol. Then 104 g of styrene are gradually added dropwise firstly at 50° C, later-on at a higher temperature. The reaction is exothermic and towards the end of the addition a temperature of 115° C is reached. During the further heating the reaction mixture becomes dark. Now 120 g of polybutadiene oil are added in order to remove the catalyst. Within the temperature range of 140 to 200° C an intensive formation of sulphur dioxide takes place and at the same time the product becomes lighter. After distilling off only partially reacted components at a temperature of about 260° C, 216 g of a soft yellow-brown product which is used for further reactions are obtained. If the same quantity of phenol-sulphonic acid is reacted instead of the sulfuric acid a product with the same properties in the same amount is obtained.

EXAMPLE 34

A product is prepared from 100 g of phenol and 111 g of styrene with 2 g of 20% oleum according to example 33 and the product is further reacted with 91 g of 30% formaldehyde solution to form a styrene containing novolak which has a dark color. Now 50 g of polybutadiene oil are added in order to remove the sulphuric acid catalyst. The reductive decomposition of the oleum essentially takes place in the temperature range between 140° and 220° C in which the volatile parts are distilled off at 260° C. 260 g of a yellow solid resin with a melting point of 68° C are obtained.

EXAMPLE 35

2 parts of a 65% aqueous phenol sulfonic acid are added to a mixture of 300 parts of phenol, 100 parts of a low-molecular polybutadiene and 10 parts of α-pinene or balsam turpentine at 65° C. It is further processed in the same way as in example 29. In a yield of 120%, referred to the total weight of the polybutadiene and the α-pinene, a yellow-brown resin having a color number of 40 to 50 is obtained. It has a melting point of 115° C, a viscosity (50% toluene/20° C) of 245 cP, a hydroxy number of 98 and an acid number of 0.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What is claimed is:

1. A process for removing discoloring amounts of color forming sulfur compounds from the reaction products of a reaction mixture containing a polybutadiene reduceable acid-reacting sulfur-containing ingredient as a reagent, reaction product or catalyst, the improvement comprising (1) reacting the reactants in the reaction mixture, (2) then reacting said acid reacting sulfur containing ingredient in the reacted mixture with an amount of polybutadiene which is sufficient to react with and reduce all of said acid-reacting sulfur containing ingredients and form volatilizable reduction products of all of said sulfur containing ingredients and (3) then heating and maintaining the reacted mixture until no more gaseous products are formed at a temperture between about ambient temperature and about 320° C that is sufficient to substantially reduce, volatilize and remove all of said sulfur containing reduction products to thereby provide an ultimate reaction product that is free of strong discoloring amounts of said color forming sulfur compounds.

2. The process of claim 1, in which said reaction mass is free of unreacted aldehydes.

3. The process of claim 1, in which said reducing and volatilizing temperature is from 170° to 280° C.

4. A process for the production of a light colored modified polybutadiene which comprises reacting a polybutadiene in the presence of an acid-reacting sulfur-containing compound with a phenol and heating the reaction product to reduce all of said acid-reacting sulfur containing compounds and form volatilizable reduction products and maintaining the reacted mixture until no more gaseous products are formed at a temperature between about ambient temperature and about 320° C that is sufficient to substantially reduce, volatilize and remove all of said sulfur containing reduction products to thereby provide an ultimate reaction product that is free of strong discoloring amounts of said color forming sulfur compounds.

5. The process of claim 1, in which the quantity of said polybutadiene added to reduce said sulfur compounds is between 2 to 20 times the weight of said sulfur compounds present in said reaction mixture.

6. The process of claim 1 in which the quantity of said butadiene added to reduce said sulfur compounds is between 3 to 30% by weight of the products of the reaction mixture.

7. The process of claim 1, in which said reducing and volatilizing temperatures are higher than the reaction temperature between said sulfur containing ingredients and said polybutadiene.

8. The process of claim 1, in which said acid-reacting sulfur containing ingredient is phenol disulfonic acid.

9. The process of claim 1, in which said reaction mixture contains a compound selected from the group consisting of phenol, bisphenol, an alkylphenol having up to 18 carbon atoms, phenyl phenols, phenolcarboxylic acids, halogeno phenols, resorcinol, cresol, xyleneol, naphthols, anisole and bis(4-hydroxyphenyl)-alkanes having up to 18 carbon atoms.

10. The process of claim 1, in which said reaction mixture contains a reaction selected from the group consisting of phenol, phenol sulfonic acid and a mixture of both and said polybutadiene in an aount being sufficient to reduce the sulfur containing ingredient the temperature at which said sulfur containing ingredient is reduced and said reduction product thereof are volatilized is higher than the temperature at which the reaction between said sulfur containing ingredient and said polybutadiene was performed.

11. The process of claim 1, in which said reactants in the reactant mixture are a) phenol and b) polybutadiene or a combination of polybutadiene with colophony, and said sulfur containing compound is sulfuric acid.

12. The process of claim 1, in which said reactants in the reactant mixture are phenol-formaldehyde resin and formaldehyde and said sulfur containing compound is phenol-sulfonic acid.

13. The process of claim 1, in which said reaction mixture contains an unsaturated terpene reactant.

14. A process of removing discoloring amounts of color forming sulfur compounds from the reaction products of a reaction mixture containing a polybutadiene reduceable acid- reacting sulfur-containing ingredient as a reagent, reaction product or catalyst, the improvement comprising (1) reacting the reactants in the reaction mixture, (2) then reacting said acid reacting sulfur containing ingredient in the reacted mixture with an amount of (a) a polybutadiene or (b) a mixture of (a) and an olefinic unsaturated terpene which amount is sufficient to react with and reduce all of said acid-reacting sulfur containing ingredients and form volatilizable reduction products of all of said sulfur containing ingredients at a temperature range from 50° to 320° C and (3) then heating and maintaining the reacted mixture until no more gaseous products are formed at a temperature between about ambient temperature and about 320° C that is sufficient to substantially reduce, volatilize and remove all of said sulfur containing reduction products to thereby provide an ultimate reaction product that is free of strong discoloring amounts of said color forming sulfur compounds, wherein one of said reactants in the reactant mixture is colophony, and said sulfur containing compound is sulfuric acid.

15. The process of claim 14, wherein one of the reactants in the reactant mixture is a phenol compound selected from the group consisting of resorcinol, cresol, o-sec. butyl phenol, 1,2,4-xylenol, o-chlorophenol and bis-phenol.

16. A process of removing discoloring amounts of color forming sulfur compounds from the reaction products of a reaction mixture containing a polybutadiene reduceable acid-reacting sulfur-containing ingredient as a reagent, reaction product or catalyst, the improvement comprising (1) reacting the reactants in the reaction mixture, (2) then reacting said reacting sulfur containing ingredient in the reacted mixture with an amount of (a) a polybutadiene or (b) a mixture of (a) and an olefinic unsaturated terpene which amount is sufficient to react with and reduce all of said acid-reacting sulfur containing ingredients and form volatilizable reduction products of all of said sulfur containing ingredients at a temperature range from 50° to 320° C and (3) then heating and maintaining the reacted mixture until no more gaseous products are formed at a temperature between about ambient temperature and about 320° C that is sufficient to substantially reduce, volatilize and remove all of said sulfur containing reduction products to thereby provide an ultimate reaction product that is free of strong discoloring amounts of said color forming sulfur compounds, wherein said reactants in the reactant mixture are phenol and ester gum, and said sulfur containing compound is sulfuric acid.

* * * * *